United States Patent [19]

Neary et al.

[11] 3,882,721

[45] May 13, 1975

[54] VANE TYPE AIRFLOW SENSOR

[75] Inventors: Donald M. Neary; John A. Doremus, both of Wayzata, Mich.

[73] Assignee: Rosemount Inc., Minneapolis, Minn.

[22] Filed: Nov. 16, 1973

[21] Appl. No.: 416,360

[52] U.S. Cl. ............................................. 73/188
[51] Int. Cl. ........................................... G01w 1/10
[58] Field of Search .................. 73/188, 189 X, 430

[56] References Cited
UNITED STATES PATENTS

| | | | |
|---|---|---|---|
| 2,604,163 | 7/1952 | Exline | 73/430 |
| 2,786,927 | 3/1957 | Veldhuis | 73/188 |
| 2,944,214 | 7/1960 | Walker | 73/188 |
| 2,965,991 | 12/1960 | Simmons | 73/188 |
| 3,069,906 | 12/1962 | Eiland | 73/188 |

OTHER PUBLICATIONS

Acheson et al., Viscous Damped Wind Vane, NBS Tech. Note 536, pp. 1–3, June 1970.

*Primary Examiner*—James J. Gill
*Assistant Examiner*—Anthony V. Ciarlante
*Attorney, Agent, or Firm*—Dugger, Johnson & Westman

[57] ABSTRACT

A vane type airflow sensor for sensing angle of attack or angle of side slip has a vane which is swept rearwardly at both the leading and trailing edges and is heated and which provides a high value of torque for operation with low inertia. The vane provides adequate torque for operating pick off devices to provide indications of deviations from a reference position.

14 Claims, 5 Drawing Figures

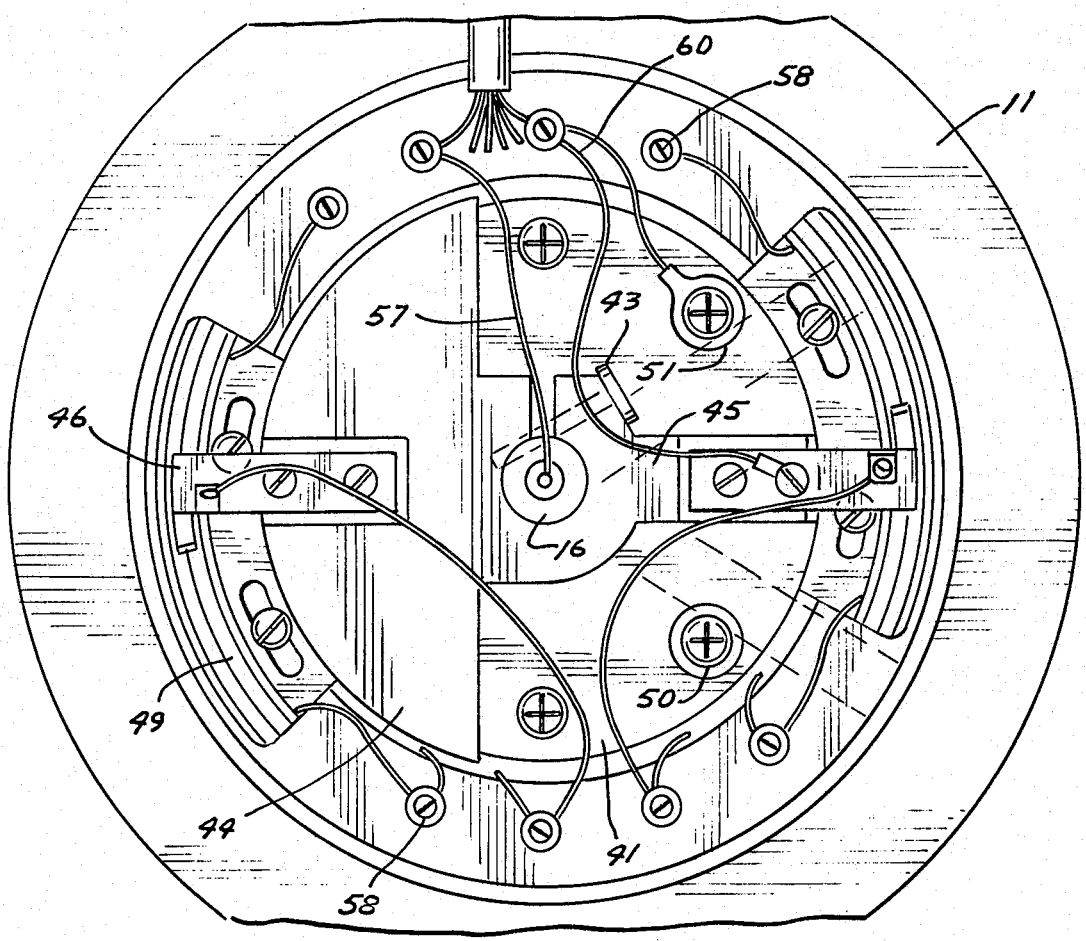
FIG. 3
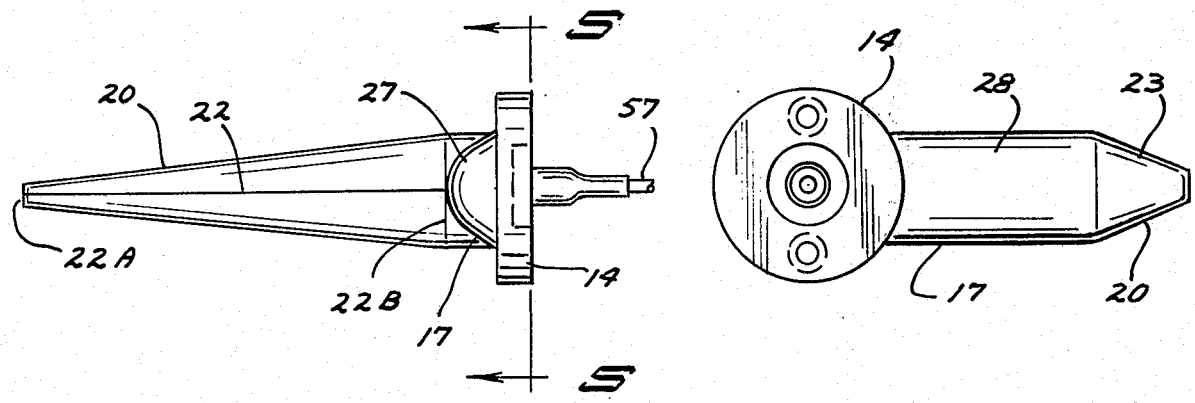
FIG. 4
FIG. 5

3,882,721

VANE TYPE AIRFLOW SENSOR

BACKGROUND OF THE INVENTION

1. Field of the Invention.

The present invention relates to airflow sensors which use a vane for sensing changes in airflow angles with respect to a body on which the sensor is mounted.

2. Prior Art.

Vane type angle of attack sensors have been used previously. Swept vane sensors are also known, in elementary form. U.S. Pat. No. 3,665,760 shows a swept vane type sensor which has a parallelogram vane providing a signal for driving a servo readout means. However, the parallelogram shape vane has a lower torque to inertia ratio than desired. Further, the operating components take up a relatively large space because they must include the servo sensors and a servo drive.

Also, other vane sensors have been used with a rectangular paddle or vane at the end of an arm which drives a shaft. Other sensors have had arms with a vane having a swept leading edge but a trailing edge parallel to the axis of rotation of the vane to assume a generally delta wing shape.

SUMMARY OF THE INVENTION

A vane type airflow sensor is disclosed which utilizes a swept vane having a high torque in relation to the inertia of the vane because of the mounting and shape of the vane. The vane is mounted on a shaft and is swept rearwardly at both its leading and trailing edges with respect to the normal direction of airflow being sensed. The edges of the vane also converge in direction away from the vane mounting. The vane arm drives a shaft that operates suitable position sensors, such as potentiometers and synchros, to give an indication of movement of the vane. The vane is fluid damped and is electrically heated. The fluid damping is incorporated into a relatively short axial length housing to make the vane sensor assembly extremely compact.

The vane is a swept type vane to provide adequate operation at supersonic and subsonic speeds without undue flutter and with minimum drag. In wind tunnel tests conducted on a vane sensor constructed as shown herein, the torque to inertia ratio is improved by a factor of two or more over that of a rectangular vane, or a swept vane that did not have edges which converged.

The shaft for the vane is mounted on suitable bearings in a housing and has a counterweight at its opposite end. An arm mounted on the shaft carries the electrical pick off means. The movement of the vane is constrained between a pair of stops to prevent overtravel. The unit is fluid damped with a plastic cup-shaped member of high coefficient of expansion moving in a cavity in the housing. The cavity has a selected volume of oil provided and the high expansion plastic cup expands thus lowering the gap between it and the housing to compensate for lowering of oil viscosity as temperature increases. Since the damping is rate sensitive the vane has a relatively uniform dynamic response over a wide range of air speeds.

BRIEF DESCRIPTION OF THE DRAWINGS

FIG. 3 is a rear view of the device in FIG. 2;

FIG. 4 is a front elevational view of the vane portion of the device in FIG. 1; and FIG. 5 is an end view of the vane shown in FIG. 4 as viewed in direction from the sensor case upwardly toward the end of the vane.

DESCRIPTION OF THE PREFERRED EMBODIMENT

Figure 1:
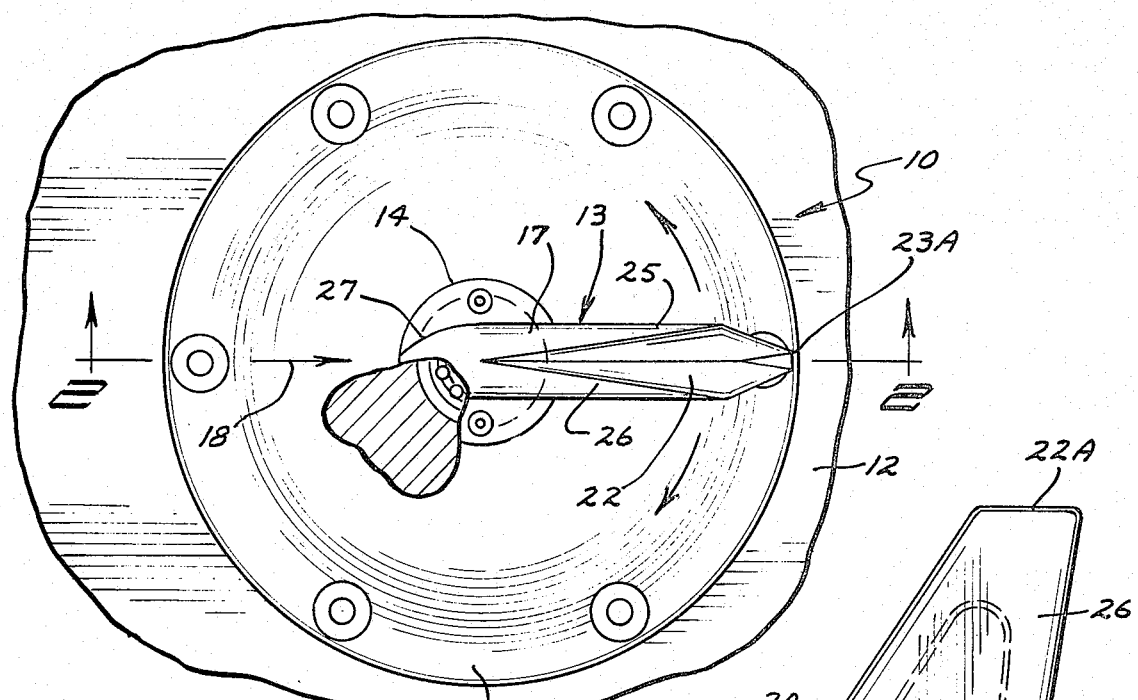
FIG. 1 is a side elevational view of a vane made according to the present invention shown installed on the side of an aircraft.
Figure 2:
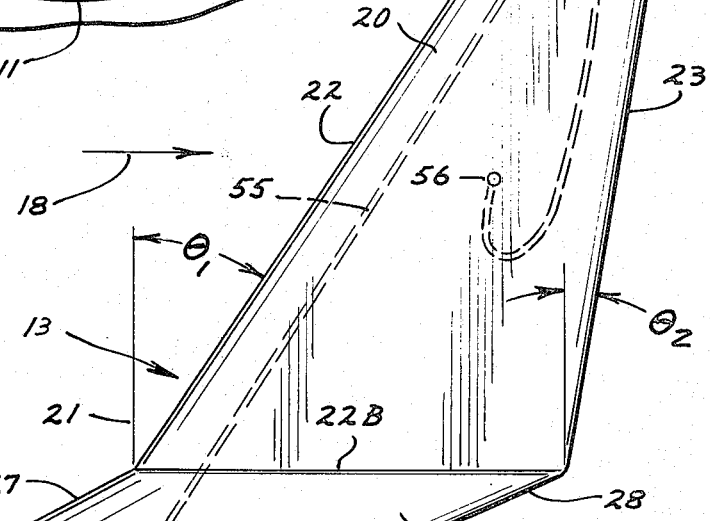
FIG. 2 is a sectional view of the device of FIG. 1 taken as on line 2—2 in FIG. 1.
Figure 2:
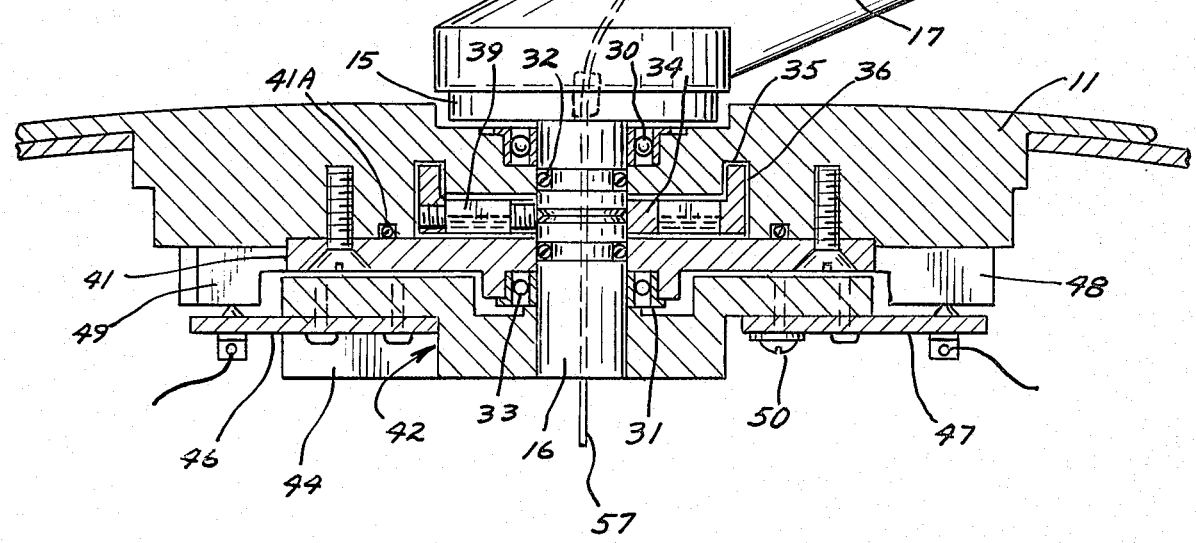

In FIG. 1, the vane type sensor assembly indicated generally at 10 has a mounting plate 11, which is attached to the body of an aircraft or other object 12. The mounting plate is fastened in place with suitable screw fasteners for flush mounting as desired. A sensing vane illustrated generally at 13, is mounted on and drives a shaft, and the vane has an attaching disc 14 at the base end thereof that is attached to the head 15 of a headed shaft 16 that forms the main drive for the unit. The head and shaft can be seen in FIG. 2. The vane as shown is attached to the head 15 with suitable screws.

The vane, as shown, comprises a torque arm 17 that extends rearwardly with respect to the normal relative direction of airflow indicated by arrow 18, and the torque arm is such that the main body of the vane indicated at 20 is to the rear of the shaft pivot axis indicated at 21.

The vane as shown has a rearwardly swept leading edge 22 and a rearwardly swept trailing edge 23. As can be seen, the leading edge 22 is formed to be relatively sharp and the vane is quite thin. The rear edge surface 23 is a planar, or flat surface joining the upper and lower surfaces indicated at 25 and 26, respectively of the vane. The vane upper and lower surfaces taper together in direction away from the shaft so the vane is thinner at its outer edge 22A than it is at the line 22B where it joins the torque arm 17. Also, the vane leading and trailing edges 22 and 23 converge in direction away from the mounting shaft. The outer edge 22A is shorter than line 22B. The angle of the edge 22 is greater than the angle of the edge 23 with respect to the direction of airflow and with respect to axis 21. As shown, edge 22 forms an angle of 35° with respect to axis 21 (smaller included angle $\theta_1$) and edge 23 forms an angle of 12° ($\theta_2$). The included angle between the surface 25 and 26 is preferably about 24°.

The torque arm 17 has a rounded leading end indicated at 27, and also gently tapers in a curve toward its rear surface 28.

The orientation of the vane with respect to the torque arm thus gives a high amount of torque around the axis 21, without high inertia and also with minimum drag. The arm is used to mount the swept vane at position to the rear of the axis of the shaft 16. The shaft 16 as shown is mounted in the mounting plate 11. The mounting plate 11 itself is only about one-half of an inch thick in axial direction of the shaft, and thus the unit is extremely compact.

The shaft is mounted in suitable sealed bearings 30 and 31, respectively which are of a conventional type having seals along the outer sides thereof. In addition, the shaft is provided with a pair of O-rings 32 and 33, respectively, that are positioned on opposite sides of a damping disc 34. The disc 34 is mounted in a cavity 35 in the mounting plate 11. As shown, the disc 34 has an outer annular flange 36 that is of greater axial length than the main part of the disc 34 and the cavity 35 is of size to accommodate the flange. The disc 34 is made of high thermal coefficient of expansion plastic (higher than that of plate 11) and is attached to the shaft 16 with a suitable set screw 38 that can be reached from one of a plurality of openings 39 defined in the disc. The cavity 35 has a preselected amount of fluid, such as an oil, therein, and there is air space left for expansion and contraction of fluid. The fluid used for damping will prevent undue flutter or undesired oscillation of the vane, to increase the stability of operation. The disc 34 expands when the temperature of operation increases to more closely fit into the cavity 35 and in this manner compensates for decreased oil viscosity.

The back side of the plate 11 is also sealed with a sealing plate 41. A suitable O-ring 41A is provided between the plate 41 and the back side of the mounting plate 11. The bearing 31 is mounted in this plate 41, and the rear O-ring 33 seals on the inner surface of the opening through the plate 41.

A counterweight assembly 42 is drivably mounted on the rear portion of the shaft 16 to the rear of the plate 41, and is clamped in place with suitable clamp screw 43 as shown. The counterweight has a main mass portion 44 and an arm 45 extending diametrically opposite from the center of the mass portion.

The counterweight portion 44 and arm 45 each mount a wiper arm 46 and 47, respectively, which comprise the movable contacts of slide wire potentiometers 48 and 49. The potentiometers 48 and 49 are adjustably mounted to plate 11 to provide for the initial adjustment of the electrical components. The weight of the vane when the unit is in its working position is counteracted by the mass portion 44 of the counterweight, and the arm 45 is positioned between two screws or studs 50 and 51, which comprise stop members, and which hold collars which extend outwardly from the plate 41 so that they will stop movement of the arm, and therefore stop movement of the vane between its extreme limits of operation.

In addition, the vane 13 has an embedded (cast in place) resistance heater wire 55 that is grounded at one end as at 56 to the vane. The heater wire is shown only in dotted lines. The other end of the heater wire is connected through a suitable connection point at the shaft and vane junction to a wire 57 that extends through an opening in the shaft 16, and then leads to external source of power from the rear of the shaft. If desired both heater wires may be brought through the shaft opening. The swept vane design is beneficial for deicing purposes because removal of ice with heat application is much better than on a straight vane. The wires for the potentiometer arms 46 and 47 are connected directly to the arms but electrically insulated from it, and then pass to suitable connection posts illustrated generally at 58, that are stationary on the sensor body. These connection posts are attached to the main plate 11, and only the short wires extending from the connection posts to the movable parts of the unit are subjected to any bending or movement when the vane operates. In addition, the shaft 16 and vane are grounded by a ground wire 60 that runs from a ground screw on the counterweight to a connection post, and then back to a terminal on the plate 41 to provide a ground without grounding through the bearings that mount the shaft. The shaft 16 and the vane 13 are both properly grounded.

The use of a swept vane at the end of a torque arm 17 provides a great deal of torque for the amount of inertia of the vane and thus increases the torque to inertia ratio. The vane has adequate torque capacity to drive a pair of potentiometer wipers or other pick offs which are connected through a suitable cable 62 to remote electrical indication instruments of a conventional type. The indication instruments are well known in the art and are used at the present time with other types. The unit is extremely short in axial length, and very compact for mounting. It is also light weight because of the shape of the vane which gives it a high torque capacity without high inertia. Further, the fluid damping disc is incorporated right into the relatively narrow mounting plate, so that fluid damping is provided without increasing the weight or size of the unit substantially. The frictional resistance due to bearings and pick offs is small so that damping force is predominantly due to the fluid damping. Thus the vane has fast response and since the torque and damping is proportional to air speed the vane has dynamic response characteristics that are relatively constant over a wide range of air speeds. The unit is electrically heated, properly grounded, and gives reliable, accurate indications of change in airflow, such as angle of attack or angle of side slip with respect to a structure such as an aircraft on which the unit is mounted.

What is claimed is:

1. An airflow sensor suitable for use on an aircraft comprising a support housing having an outwardly facing surface, a shaft rotatably mounted in said housing about a shaft axis, a vane mounted on said shaft and extending outwardly from said outwardly facing surface of said housing in a preselected orientation thereto, said vane being positioned to be assymmetrically located with respect to said axis and having a leading edge swept rearwardly with respect to normal fluid flow at a first acute angle, and said vane further having a trailing edge swept rearwardly at an angle less than said first acute angle whereby said vane swept edges converge in direction outwardly from said outwardly facing surface, counterweight means mounted on said shaft and positioned on the interior of said housing for counterbalancing said vane, and means to sense movement of said shaft from a first preselected rotational position.

2. The combination specified in claim 1 wherein said vane comprises an arm portion and a main portion, said main portion having said rearwardly swept edges, said main portion being positioned substantially entirely rearwardly of the axis of rotation of said shaft with respect to the normal direction of fluid flow sensed by said vane.

3. The combination as specified in claim 1 wherein said housing comprises a plate member, bearing means mounted in said plate member for rotationally mounting said shaft, said counterweight means being on the opposite side of said plate member from said vane, said counterweight means being of size and position to counterbalance said vane to a preselected normal position of said shaft, and stop means cooperating between said plate and said counterweight means to limit the rotational movement of said shaft between preselected stopped positions in either direction of rotation from said preselected normal position.

4. The combination specified in claim 3 wherein said means to sense movement of said shaft comprises electrical sensing means mounted on said plate adjacent said counterweight means, and means on said counterweight means cooperating with said electrical sensing means on said plate to change in electrical characteristics upon rotation of said shaft from its preselected normal position.

5. The combination specified in claim 4 wherein said electrical sensing means comprises a potentiometer mounted on said plate, and means connecting the movable contact of said potentiometer to a portion of said counterweight means.

6. The combination as specified in claim 3 wherein said stop means cooperating between said counterweight means and said plate comprise an arm member extending outwardly from said counterweight means on an opposite side of said shaft from the said counterweight means, and a pair of stud members mounted to said plate at spaced locations, said arm member being movable between said stud members.

7. The combination specified in claim 6 wherein said means to sense relative rotation of said shaft comprises a pair of electrical sensing means located on opposite diametrical positions on said plate, and means carried by said counterweight means and said arm, respectively, to cooperate with said electrical sensing means to give an electrical indication upon movement of said shaft from said preselected normal position.

8. The combination specified in claim 1 and a fluid dampening means connected to said shaft, said dampening means comprising a cavity defined in said housing, and a disc member drivably mounted on said shaft and positioned at least partially in said cavity, said cavity containing a preselected amount of oil therein.

9. The combination specified in claim 8 wherein said disc member extends radially from said shaft to an outer edge and has an annularly extending flange at said outer edge, said flange extending in axial direction of said shaft a distance greater than the thickness of said disc member, and said cavity having an annular portion of size to receive said flange.

10. The combination specified in claim 8 wherein said disc member has a plurality of openings defined therein, at least some of said openings defining spaces containing a compressible fluid.

11. The combination specified in claim 8 wherein said disc member comprises a material having a thermal coefficient of expansion substantially greater than that of said housing, whereby said disc member will reduce the clearances between said disc member and said housing upon increases in temperature from a reference temperature and a corresponding drop in viscosity of the oil in said cavity.

12. The combination specified in claim 1 and a resistance heater wire mounted on said vane, means to ground a first end of said heater wire to said vane, said shaft having an axial opening therethrough, and an electrical power wire connected to an opposite end of said heater wire and passing through the opening in said shaft to the opposite end of said shaft from said vane.

13. The combination specified in claim 12 and a flexible ground wire attached to said counterweight means, said ground wire being connected to said housing.

14. The combination specified in claim 1 wherein said vane has upper and lower surfaces joining along said leading edge, and diverging in the direction of normal air flow toward said trailing edge, said upper and lower surfaces also converging in a direction parallel to the shaft axis and outwardly from said shaft, and said vane further having a substantially planar surface defining said trailing edge and joining said upper and lower surfaces.

* * * * *